(12) United States Patent
Albert

(10) Patent No.: US 9,808,897 B2
(45) Date of Patent: Nov. 7, 2017

(54) MACHINE TOOL COMPRISING A LONGITUDINAL RAIL AND A TRANSVERSE ARM

(71) Applicant: AIRBUS OPERATIONS S.A.S., Toulouse (FR)

(72) Inventor: Fabien Albert, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 528 days.

(21) Appl. No.: 14/509,185

(22) Filed: Oct. 8, 2014

(65) Prior Publication Data

US 2015/0096777 A1     Apr. 9, 2015

(30) Foreign Application Priority Data

Oct. 8, 2013   (FR) ...................................... 13 59747

(51) Int. Cl.
| | | |
|---|---|---|
| B23Q 9/00 | (2006.01) | |
| B23Q 1/62 | (2006.01) | |
| B21J 15/14 | (2006.01) | |

(52) U.S. Cl.
CPC ........... *B23Q 9/0007* (2013.01); *B23Q 1/621* (2013.01); *B23Q 9/0014* (2013.01); *B23Q 9/0042* (2013.01); *B21J 15/142* (2013.01); *B23Q 2210/008* (2013.01)

(58) Field of Classification Search
CPC ... B23Q 1/28; B23Q 1/62; B23Q 9/00; B23Q 9/0014; B23Q 9/0042; B23Q 9/00071; B62D 57/024; B21J 15/142
USPC ...... 173/31, 32, 35, 37; 408/76, 77, 98, 1 R, 408/13; 409/132, 178; 29/33 R, 33 K, 29/34 B, 93 R, 243.54, 244, 243.5
See application file for complete search history.

(56) References Cited

U.S. PATENT DOCUMENTS

| | | | | |
|---|---|---|---|---|
| 3,226,027 A | | 12/1965 | Cable et al. | |
| 5,383,751 A | * | 1/1995 | Wheetley | ................ B23B 39/00 408/1 R |
| 5,468,099 A | * | 11/1995 | Wheetley | ................ B23B 39/04 180/8.1 |
| 5,477,597 A | * | 12/1995 | Catania | .................... B21J 15/10 29/33 K |
| 5,562,043 A | * | 10/1996 | Gromes | ............... B23K 37/047 104/106 |

(Continued)

FOREIGN PATENT DOCUMENTS

| | | |
|---|---|---|
| DE | 10318490 A1 | 11/2004 |
| DE | 102008042524 A1 | 4/2010 |

OTHER PUBLICATIONS

French Patent Office, French Search Report for French Patent Application 1359747 dated May 14, 2014.

*Primary Examiner* — Scott A. Smith
(74) *Attorney, Agent, or Firm* — Lorenz & Kopf, LLP

(57) ABSTRACT

A machine tool adapted to perform operations, for example, machining, on a surface of a part of large size is provided. The machine tool comprises a longitudinal rail and a transverse arm, orthogonal to the longitudinal rail, slidingly fastened at a first end to the longitudinal rail. A second end of the transverse arm is provided with a unit comprising a holding device enabling the unit to be held in position on the part during an operation. The transverse arm bearing a tool is thus precisely positioned on the part on which the operations are carried out.

15 Claims, 1 Drawing Sheet

(56) References Cited

U.S. PATENT DOCUMENTS

| | | | | |
|---|---|---|---|---|
| 6,088,897 | A | * | 7/2000 | Banks ...................... B21J 15/10 227/51 |
| 6,158,666 | A | * | 12/2000 | Banks ...................... B21J 15/10 105/25 |
| 6,220,099 | B1 | * | 4/2001 | Marti ................... G01N 29/226 73/633 |
| 6,926,094 | B2 | * | 8/2005 | Arntson ................. B23B 39/18 173/31 |
| 7,216,408 | B2 | * | 5/2007 | Boyl-Davis .......... B23Q 9/0014 29/33 R |
| 7,273,333 | B2 | * | 9/2007 | Buttrick, Jr. ......... B23Q 9/0042 408/1 R |
| 7,794,183 | B2 | * | 9/2010 | Wright ................. B23Q 9/0042 408/1 R |
| 8,365,376 | B2 | * | 2/2013 | Reid ....................... B21J 15/14 254/93 R |
| 2004/0265076 | A1 | | 12/2004 | Buttrick, Jr. et al. |
| 2005/0265798 | A1 | | 12/2005 | Boyl-Davis et al. |
| 2007/0036618 | A1 | * | 2/2007 | Fritsche .................. B23Q 1/28 408/56 |
| 2012/0014759 | A1 | | 1/2012 | Sarh et al. |

\* cited by examiner

MACHINE TOOL COMPRISING A LONGITUDINAL RAIL AND A TRANSVERSE ARM

CROSS REFERENCE TO RELATED APPLICATION

This application claims priority to French Patent Application No. 1359747, filed Oct. 8, 2013, which is incorporated herein by reference in its entirety.

TECHNICAL FIELD

The technical field concerns a machine tool for performing surface operations on a part, in particular of large size, for example for producing bores on a member of an aircraft fuselage.

The technical field relates more generally to the field of machine tools used to carry out automated or semi-automated operations, typically machining or mounting operations, on parts or structures of large size.

BACKGROUND

The manufacture of aircraft fuselages or other aeronautical structures such as wings is carried out in known manner by the assembly of rigid panels, which are generally of metal, onto a structure. For this the panels, which are planar or curved, are placed in position on the structure and assembled thereto for example by riveting. This requires being able to machine the assembly once the panels are in position, typically in order to produce the bores necessary for the riveting.

These operations may be carried out by an operator. The development of robots of large size capable of producing the bores over the entirety of a fuselage is costly.

In order to make these bores or perform other simple machining operations on assemblies of large size, rapidly and with accuracy, devices have nevertheless been developed in order to partly automate these operations.

For example, European Patent Application EP1761360 presents a machine tool comprising two parallel flexible rails which are fastened to the structure to be machined. The fastening of the rails onto the structure is carried out using suction cups. A machining means, typically a drill, travels between the two rails, along a transverse module.

Such a device is however complicated to implement, in that it comprises two rails which must be perfectly parallel. Furthermore, by construction, the width between the two rails, and the area which can be reached by the machining tool, are limited. Lastly, such a device is not adapted to a surface having a strong double curvature, on account of the difficulty in positioning two rails parallel on such a surface. A pronounced double curvature is present in certain zones of aeronautical structures and in particular of certain fuselages.

In addition, other objects, desirable features and characteristics will become apparent from the subsequent summary and detailed description, and the appended claims, taken in conjunction with the accompanying drawings and this background.

SUMMARY

The various teachings of the present disclosure are directed to solving at least one of the aforesaid drawbacks.

To that end, the present disclosure relates to a machine tool for carrying out operations on a part comprising: a longitudinal rail configured to be positioned relative to the part; a transverse arm, orthogonal to the longitudinal rail, comprising a first end mounted for translational movement on a longitudinal rail; and a tool carried by the transverse arm, in which a second end of the transverse arm is provided with a unit comprising a holding means enabling the unit to be held in position on the part and in which the unit is motorized and comprises a travel system for crawling on the part, parallel to the longitudinal rail.

The unit is in this case held in continuous contact with the part.

The machine tool comprises a single longitudinal rail. The rail may be positioned fixedly relative to the part. Such a machine tool is simple to implement since it requires the putting into position of a single rail. It may be adapted to carrying out operations on a part having a surface with dual curvature, since it does not require the putting in position of two parallel rails. It is adapted to structures of large size, and enables operations over a large area. To be precise, a transverse arm of long length, for example of the order of 1200 mm, may be implemented. The proper holding of the transverse arm is ensured by the fastening or the continuous position control of its two ends, respectively on the longitudinal rail and on the part by a suction cup, when an operation is carried out on the part.

According to one embodiment, the holding means comprises a suction cup.

According to various embodiments, the holding means comprises a device chosen from: a magnetic device, a self-adhering belt, and a device generating Van der Walls forces.

According to one embodiment, the unit may comprise a caterpillar track. This caterpillar track may comprise a tread comprising a plurality of suction cups.

According to one embodiment, the unit may comprise a motorized roller. In this embodiment, the machine tool may comprise a control device, arranged so as to synchronize the movement of the unit with the movement of the first end of the transverse arm along the longitudinal rail. The machine tool may then comprise means for determining the forces generated by the transverse arm on the longitudinal rail, said force determining means being functionally linked to the control device, and the control device being configured to minimize said forces.

The tool may be configured so as to be able to move in translation along the transverse arm. The tool may in one example, be chosen from: a drill, a grinder, a tribology probe, a rivet insertion device, a riveting device, a mastic gun, a paint spray gun.

The mounting for translational movement of the transverse arm on the longitudinal rail is made by a module rigidly linked to the transverse arm and mounted for translational movement on the longitudinal rail.

The longitudinal rail may be flexible, so as to be able to adapt to a radius of curvature of the part.

The fastening of the longitudinal rail on the part is carried out using fastening suction cups. To that end, the longitudinal rail in one example, comprises fastening suction cups.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
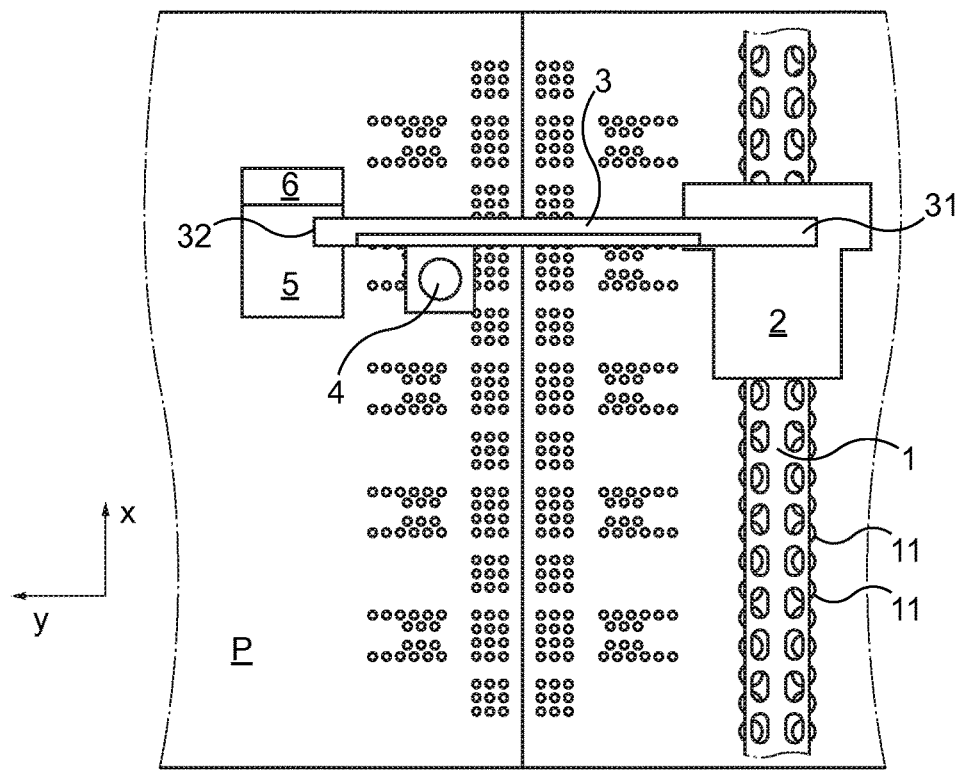
FIG. 1 diagrammatically presents a machine tool according to an embodiment of the present disclosure, as well as its immediate environment.

A machine tool in accordance with one embodiment of the present disclosure represented in FIG. 1 comprises a longitudinal rail 1. In this embodiment, the longitudinal rail 1 comprises fastening suction cups 11, making it possible to provide the fastening thereof onto the part P on which operations for example of machining are to be conducted. Here, the longitudinal rail 1 is flexible and may thus follow the curvature of the part P. A module 2 is mounted on the longitudinal rail 1 and may move in translation thereon. The module 2 may be equipped with one or more motors driving its translation on the longitudinal rail 1.

A transverse arm 3 is fastened to the module 2, at the location of a first end 31 of the transverse arm 3. The transverse arm 3 is, and remains, substantially orthogonal to the longitudinal rail 1. The transverse arm 3 may move in translation along the longitudinal rail 1. In the example represented here, this translation is directly linked to the translation of the module 2 along the longitudinal rail 1. The module 2 may be configured in order to receive a power unit, not shown, containing the power electronics for the devices involved in the machine tool. In an aeronautical application, the transverse arm may have a length enabling machining operations over approximately 1200 mm.

A tool 4, typically a machining tool, is linked to the transverse arm 3. The tool 4 may in practice comprise a module which connects to the transverse arm 3 via an interface, this module containing a work tool. The module containing the work tool thus serves to provide the mechanical link to the arm, to provide the energies necessary for the operation of the work tool, and to provide the functionality thereof by virtue of various peripheral devices such as jacks, sensors, etc. The tool is configured to move in translation along the transverse arm 3. The tool 4 is thus has a sliding link with the transverse arm 3. The tool 4 may in one example, be a device for actual machining or a device for machining fastened to a support itself linked to the transverse arm 3.

The tool 4 could in one example, be a drill, or a boring tool termed "automatic boring unit". It may also be by way of example and non-exhaustively a tool for cutting, grinding, dimensional verification, non-destructive testing for example with ultrasound, blind hole detection, mastic application, adhesive application, paint application.

The translation of the tool 4 along the transverse arm 3 may be motorized.

The motors for driving the movement of the module 2 along the longitudinal rail and/or that of the tool 4 along the transverse arm 3 may be of the "stepper" type. They are associated with an electronic control system (not shown) enabling the position control thereof to be provided.

Thus, the position of the tool may be very accurately controlled in an orthogonal frame of reference having an axis parallel to the longitudinal rail (so-called "x" position) and an axis parallel to the transverse arm (so-called "y" position).

Any other device also known from the state of the art enabling the position of the tool to be piloted and controlled on the basis of these two axes may also be used.

The tool may also, according to various embodiments of the present disclosure, be controlled in orientation on the basis of three orthogonal rotation axes, or according to one, or two, of these three axes.

Figure 2:
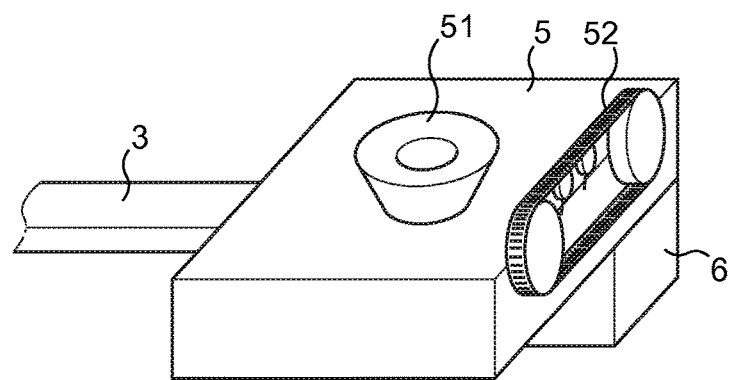
FIG. 2 presents a detailed view of a unit of the transverse arm as implemented in an embodiment of the present disclosure according to a three-dimensional schematic view.

The transverse arm 3 of the machine tool comprises a unit 5. The unit 5 is fastened to a second end 32 of the transverse arm 3. FIG. 2 presents one embodiment thereof, as a diagrammatic view in three dimensions. In this embodiment, the unit 5 comprises a suction cup 51. The suction cup 51 enables the holding in position of the unit 5 relative to the part P, during an operation on the part P which may generate forces in the transverse arm 3. In FIG. 2, the visible surface of the unit 5 bearing the suction cup 51 is thus the face configured to face part P. The suction cup 51 is supplied with vacuum by vacuum generation means, or a vacuum generation unit, and a vacuum supply line (not shown). The vacuum generation means may be common to the supply of the suction cup 51 and to the fastening suction cups 11.

The suction cup 51 may be fixed, or be retractable entirely or partly into the unit 5, so as to be away from the part P during its movement. The suction cup 51 is in this case place in contact with the part P then reduced pressure is applied inside the suction cup in order to immobilize it on the part P.

The unit 5 may comprise several suction cups 51.

In the embodiment illustrated here, the unit 5 is motorized. The motorization of the unit 5 enables its travel over the part P to be guided, parallel to the longitudinal rail 1. The unit 5 comprises a caterpillar track 52 as a travel system. The unit 5 so motorized is adapted to crawl on the part P parallel to the longitudinal rail 1.

A device so constituted to move slowly or crawl over a surface is commonly designated by the term "crawler".

The caterpillar track 52 comprises a rubber tread giving a good coefficient of friction on the part.

The movement of the unit 5, in the embodiments in which it is motorized and configured to crawl over the part parallel to the longitudinal rail, as in the embodiment represented here, is controlled by a control unit 6. The control unit is, in the embodiment of the present disclosure represented here, linked to the unit 5.

The control device 6 is directed to synchronizing the movement of the unit 5 with that of the module 2 along the longitudinal rail 1.

On a planar surface, the movement of the unit 5 must be identical at all times to that of the module 2 along the longitudinal rail 1, in order to ensure identical and simultaneous travel of these elements. On the contrary, at the time of a use of the machine tool on a surface having a dual curvature, for example at the front of the fuselage of an aircraft, the speed of the unit 5 must be different from the speed of the module 2 in order to ensure that the unit 5 and the module 2 travel in synchronized manner, even though the distance to cover by the unit 5 and the module 2 are different. The control device 6 enables such management of the travels of the unit 5 and the module 2.

Furthermore, the synchronization of the movement of the unit 5 and of the module 2 along the longitudinal rail 1 enables more precise positioning of the transverse arm 3. To be precise, the cantilevered mounting in relation to its fastening to the longitudinal rail 1 of the transverse arm 3, as well as the mass of the tool 4 and its position on the transverse arm 3 may lead to slight bending of the transverse arm 3.

Lastly, the cantilevered mounting of the transverse arm 3, the mass and the position of the tool 4 generate potentially high forces in the link between the transverse arm 3 and the longitudinal rail 1, which should be limited by good synchronization of the movement of the unit 5 and of the module 2. To that end, the machine tool may be provided with device that determines the forces generated by the transverse arm at the location of its link with the longitudinal rail. This may typically be strain gauges or sensors, enabling the determination of the couple in the link between the longitudinal rail 1 and the transverse arm 3, linked to the cantilevered mounting of the latter.

The device that determines forces are functionally linked to the control device. The control device thus receives the measurements from the sensors, and, according to those measurements and/or their interpretation, controls the movement of the unit 5, by its motorization, so as to minimize the forces generated by the transverse arm at the location of its link with the longitudinal rail.

Generally, the machine tool may comprise a group of geometric control devices (not illustrated) making it possible to identify the deformations (bending, twisting) capable of affecting the accuracy of the positioning of the tool 4, and to correct that positioning via a correction loop.

In the case of a machine tool comprising a non-motorized unit 5, the control device enabling the position control of the module 2 along the longitudinal rail 1 and/or of the tool 4 along the transverse arm 3 may be configured to take into account the deformations of the machine tool generated by the mounting and overhang of the transverse arm 3, the mass and the position of the tool 4. In the case of a machine tool comprising a non-motorized unit 5, the unit 5 is moved at a small distance from the surface of the part P, when the transverse arm 3 moves.

Of course, other embodiments or variants of the machine tool may be envisioned without departing from the scope of the present disclosure.

In one example, other mechanisms for fastening the longitudinal rail 1 onto the part P may be employed, for example magnetic devices.

In one embodiment of the present disclosure, the longitudinal rail 1 does not comprise means for direct fastening onto the part to machine. In this variant, the longitudinal rail 1 is not laid on the part P or in contact with the latter, but forms part of a neighboring installation or "work station". The longitudinal rail 1 is then fixedly positioned in relation to the part, by immobilizing the part P relative to the work station.

The holding device of the unit 5 may comprise a suction cup or a plurality of suction cups, whether or not supplied with reduced pressure. Alternatively or in addition to the suction cups, it may comprise a device chosen from: a magnetic device, a self-adhering belt, and a device generating Van der Walls forces.

Alternatively to the caterpillar track having a rubbery tread already described, the travel system of a motorized unit 5 may comprise a caterpillar track of suction cup type, that is to say constituted by a tread comprising suction cups, providing good contact between the unit 5 and the part P during the movement of the unit 5 and of the transverse arm 3. In this embodiment, the suction cups of the tread may be passive, and stick to the surface of the part P progressively with the movement under the sole effect of the force of the unit 5 pressing against the part P. The suction cups of the tread may alternatively be active, supplied with vacuum when they are in contact with the part P by the vacuum generation device. Such suction cups may be employed as holding device for the unit 5 on machining the part P, without an additional suction cup being necessary for that function.

Alternatively, other travel systems may be employed. For example, in one embodiment, one or more motorized rollers are utilized. In one example, the roller or rollers comprise a tread of rubbery material. According to other examples, the travel system comprises an air cushion, a magnetic device, or a self-adhering belt.

In the case of a machine tool of which the unit 5 is motorized, the control device 6 may have various locations and features. As an alternative to a position linked to unit 5, the control device 6 may be carried by module 2, or by any other member of the machine tool. It may be external to the machine tool. The control device 6 may also employ the same physical devices (computers, etc.) as the device controlling the travel of the module 2 on the longitudinal rail 1. Lastly, the control data arising from the control device may be sent to the unit 5 by wired or wireless mechanisms.

A machine tool as described above may be used for example for boring riveting holes of a fuselage part of an aircraft. The boring method may be carried out according to the method described below. First of all, the longitudinal rail 1 is positioned on the basis of predefined positioning on the fuselage part. The module 2 is positioned in terms of "x", that is to say along the longitudinal rail 1, according to a predefined first position. In an embodiment of the present disclosure in which it is motorized, the unit 5 crawls along the fuselage part, parallel to the longitudinal rail 1, in a manner that is synchronized with the module 2. Once the module 2 and the unit 5 have been positioned, the holding device for the unit 5 is implemented so as to immobilize unit 5 in relation to the fuselage part. Typically, when the holding device of the machine tool employed comprises a suction cup 51, the suction cup 51 is placed in contact with the fuselage part, and reduced pressure is established in the suction cup 51 so as to immobilize the unit 5. The unit 5 is then held in position by the reduced pressure generated in the suction cup 51. The unit 5, then rigidly connected to the second end 32 of the transverse arm 3, constitutes a stable anchorage onto the part P for the second end 32 of the transverse arm 3. As regards the first end 31 of the transverse arm, this is immobilized on the longitudinal rail 1. Thus, the transverse arm 3 is totally immobilized and provides a stable bearing structure for the tool 4, when the operation on part P is carried out.

The tool 4, which in the case described here is an autonomous boring unit, is positioned along the transverse arm 3, in terms of "y" so as to produce a first bore at a predetermined precise point on the fuselage part.

The holding means is then relaxed, for example the reduced pressure in the suction cup 51 is released, such that the unit 5 is again movable relative to the fuselage part.

The tool is then positioned so as to produce a second bore at a second point of the fuselage part. The tool may be made to travel or be shifted in terms of "x" by traveling of the module 2 along the longitudinal rail 1 while the motorized unit 5 crawls on the surface of the fuselage part with synchronized traveling, and made to travel in terms of "y" along the transverse arm 3.

As described previously, the holding means is implemented and the transverse arm 3 is immobilized, then the second bore is produced.

The module 2 is made to travel to the second predefined position along the longitudinal rail 1. Once the module 2 and the unit 5 have been positioned correctly, the suction cup 51 is employed to immobilize the unit 5 relative to the fuselage part. A second row of bores may then be carried out.

The bores provided in the zone capable of being reached by the machine tool may thus be made before traveling of the machine tool to make the bores in another zone.

Other operations may be carried out using a machine tool according to the present disclosure. Certain operations, such as cutting out or milling may require constant movement of the tool along both the "x" and the "y" axes. This is carried out by simultaneous movement of the module 2 along the longitudinal rail 1, of the tool 4 along the transverse arm 3, and, the case arising, of the unit 5 if the latter is motorized.

The machine tool so developed enables automated or semi-automated operations to be carried out, for example, simple machining operations, on the surface of a part of large size which may typically be a member of an aircraft fuselage. There being only one rail to position as longitudinal reference on the part, the machine tool developed may be adapted, according to the embodiment considered, to structures having double curvature. It is furthermore easy to install, such that, typically, a single operator may suffice for its implementation. It enables the carrying out of operations, for example machining, over a large surface by virtue of a long arm length. This is rendered possible by the immobilization or continuous position control of both ends of the arm when operations are carried out on the part. The machine tool developed is furthermore easily reconfigurable, and may take numerous types of tools enabling numerous types of machining, assembly, or control operations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A machine tool for carrying out operations on a part comprising:
   a longitudinal rail configured to be positioned relative to the part, and further configured to be removably fastened to the part;
   a transverse arm, orthogonal to the longitudinal rail, including a first end mounted for translational movement on the longitudinal rail; and
   a tool carried by the transverse arm;
   wherein a second end of the transverse arm is provided with a unit comprising a holding device enabling the unit to be removably held in position on the part, and the unit is motorized and includes a travel system for crawling on the part, parallel to the longitudinal rail, and wherein the tool is configured for controlled translational movement along the transverse arm between the first and second ends of the transverse arm.

2. The machine tool according to claim 1, wherein the holding device comprises a suction cup.

3. The machine tool according to claim 1, wherein the holding device comprises a device selected from the group comprising: a magnetic device, a self-adhering belt, and a device generating Van der Walls forces.

4. The machine tool according to claim 1, wherein the travel system comprises a caterpillar track.

5. The machine tool according to claim 4, wherein the caterpillar track comprises a tread comprising a plurality of suction cups.

6. The machine tool according to claim 1, wherein the travel system comprises a motorized roller.

7. The machine tool according to claim 1, further comprising a control device, arranged so as to synchronize the movement of the unit with the movement of the first end of the transverse arm along the longitudinal rail.

8. The machine tool according to claim 7, further comprising a device that determines the forces generated by the transverse arm on the longitudinal rail, said device functionally linked to the control device, and the control device configured to minimize said forces.

9. The machine tool according to claim 1, wherein the mounting for translational movement between the transverse arm and the longitudinal rail is made by a module rigidly linked to the transverse arm and mounted for translational movement on the longitudinal rail.

10. The machine tool according to claim 1, wherein the longitudinal rail is flexible, so as to be able to adapt to a radius of curvature of the part.

11. The machine tool according to claim 1, wherein the longitudinal rail comprises fastening suction cups.

12. A machine tool for carrying out operations on a part comprising:
    a longitudinal rail configured to be positioned relative to the part, and further configured to be removably fastened to the part;
    a transverse arm, orthogonal to the longitudinal rail, including a first end mounted for translational movement on the longitudinal rail and a second end, the second end of the transverse arm provided with a unit comprising a holding device enabling the unit to be removably held in position on the part, and the unit is motorized and includes a travel system for crawling on the part, parallel to the longitudinal rail;
    a tool carried by the transverse arm, wherein the tool is configured for controlled translational movement along the transverse arm between the first and second ends of the transverse arm; and
    a control device, arranged so as to synchronize the movement of the unit with the movement of the first end of the transverse arm along the longitudinal rail.

13. The machine tool according to claim 12, further comprising a device that determines the forces generated by the transverse arm on the longitudinal rail, said device functionally linked to the control device, and the control device configured to minimize said forces.

14. The machine tool according to claim 12, wherein the holding device comprises a suction cup.

15. The machine tool according to claim 12, wherein the holding device comprises a device selected from the group comprising: a magnetic device, a self-adhering belt, and a device generating Van der Walls forces.

* * * * *